(12) United States Patent
Lehmann et al.

(10) Patent No.: US 7,305,947 B2
(45) Date of Patent: Dec. 11, 2007

(54) SEALING ELEMENT AND PIVOTING MOTOR

(75) Inventors: Kai Lehmann, Ludwigsfelde (DE); Jörg Rösener, Berlin (DE)

(73) Assignee: DaimlerChrysler AG, Stuttgart (DE)

( * ) Notice: Subject to any disclaimer, the term of this patent is extended or adjusted under 35 U.S.C. 154(b) by 376 days.

(21) Appl. No.: 11/062,308

(22) Filed: Feb. 15, 2005

(65) Prior Publication Data

US 2005/0191171 A1 Sep. 1, 2005

Related U.S. Application Data

(63) Continuation-in-part of application No. PCT/EP03/08277, filed on Jul. 26, 2003.

(30) Foreign Application Priority Data

Aug. 16, 2002 (DE) ................................ 102 37 414

(51) Int. Cl.
*F01L 1/34* (2006.01)
(52) U.S. Cl. ................................ 123/90.17; 123/90.15; 464/160
(58) Field of Classification Search ............. 123/90.15, 123/90.16, 90.17, 90.18; 464/1, 2, 160
See application file for complete search history.

(56) References Cited

U.S. PATENT DOCUMENTS

| 3,215,046 | A |  | 11/1965 | Drake |
|---|---|---|---|---|
| 5,332,236 | A |  | 7/1994 | Kastuhara et al. |
| 5,983,782 | A |  | 11/1999 | Lebrun et al. |
| 6,237,466 | B1 | * | 5/2001 | Fukuhara et al. ............. 92/125 |
| 6,412,463 | B1 |  | 7/2002 | Kinugawa |

FOREIGN PATENT DOCUMENTS

| DE | 34 20 150 | 12/1985 |
|---|---|---|
| DE | 198 34 143 | 2/2000 |
| DE | 199 22 194 | 6/2000 |
| EP | 0 818 610 | 7/1997 |
| JP | 11 093628 | 4/1997 |
| JP | 11 030111 | 2/1999 |

* cited by examiner

*Primary Examiner*—Ching Chang
(74) *Attorney, Agent, or Firm*—Klaus J. Bach

(57) ABSTRACT

In a sealing element, in particular for forming a seal between an impeller or rotary piston of a pivoting motor and a component surrounding the impeller, wherein the sealing element includes a base body with a first spring element integrally formed on a basic body for generating a first sealing pressure force, the basic body has an inner space to which a pressure medium is admitted in order to generate a second sealing pressure force intensifying the first sealing pressure force.

13 Claims, 3 Drawing Sheets

SEALING ELEMENT AND PIVOTING MOTOR

This is a Continuation-in-Part application of International application PCT/EP2003/08277 filed Jul. 26, 2003 and claiming the priority of German application 102 37 414.7 filed Aug. 16, 2002.

BACKGROUND OF THE INVENTION

The invention relates to a sealing element including a spring member for generating a seal pressure and to a pivoting motor.

DE 198 34 143 A1 discloses a generic sealing element for sealing off between an impeller (rotary piston) of a camshaft timing device and a housing surrounding the impeller. The sealing element comprises a hollow-cylindrical base body, on which two spring wings pointing away from one another are integrally formed for generating a pressure on the seal engagement surfaces. The basic body is detained in a groove of a vane of the impeller, and the spring wings bear sealingly with their free ends against an inside of the housing surrounding the impeller, the spring wings in each case generating a sealing pressure force.

It is the object of the invention to provide a compact space-saving sealing element which is easy to handle and which has advantageous sealing properties.

SUMMARY OF THE INVENTION

In a sealing element, in particular for forming a seal between an impeller or rotary piston of a pivoting motor and a component surrounding the impeller, wherein the sealing element includes a base body with a first spring element integrally formed on a basic body for generating a first sealing pressure force, the basic body has an inner space to which a pressure medium is admitted in order to generate a second sealing pressure force intensifying the first sealing pressure force.

The arrangement forms a piston-like compact sealing element, which is simple to handle, and, in particular, can in a simple way be separated from other sealing elements and can easily be installed and, furthermore, has advantageous sealing properties. The base body can advantageously be designed moveably and the play which facilitates mounting can advantageously be compensated for, with the result that the solution according to the invention is suitable particularly for devices in which simple mounting and play compensation are among essential criteria, as is the case particularly with pivoting motors and especially with pivoting motors for camshaft timing devices.

The basic body may have various profiles such that it is open on one side and closed on three sides, so as to form a lightweight sealing element resembling a skirt-type piston, the inner space of which can be acted upon by a pressure medium via the open side and, for example, advantageously via a clearance space due to play with respect to an adjacent component. Moreover, as a result of the play, a desirable movability for the base body can be achieved, so that the sealing element can advantageously bear sealingly with its sealing surfaces against matching sealing surfaces.

Furthermore, by means of an appropriate profile, large effective surface areas for the pressure medium can be provided in the inner space, and, advantageously, a single, closed sealing surface can be obtained with respect to the adjacent component, particularly in the radial direction outwards or in the radial direction inwards in the case of a pivoting motor. The basic body may in this case have a U-profile, a W-profile or other corresponding profiles which appear expedient to a person skilled in the art. However, as regards a U-profile with a first and a second side wall and with a bottom part, a component can be obtained which is particularly simple in structural terms and can be produced cost-effectively in one stamping/bending process, and in which an outer surface of the bottom part facing away from the side walls can be provided in a simple manner so as to form a sealing surface.

If this outer surface has a convex configuration, providing advantageously for small linear sealing contact area with respect to an adjacent component as the outer curved surface can be produced simply and cost-effectively by bending.

In a further refinement of the invention, the first spring element may be integrally formed along the end of the first side wall, which faces away from the bottom part. Undesirable influences of the spring element and of its integral-forming region on the sealing action, in particular, on the sealing action in the axial direction, can be largely avoided.

If the first spring element has two spring arms extending in the axial direction of the basic body, an at least largely symmetrically distributed uniform sealing pressure force caused by the spring element can be achieved, specifically, when a second spring element corresponding to the first spring element is integrally formed on the second side wall on that end face of the latter which faces away from the bottom part. Furthermore, the spring elements at the end face facing away from the bottom part can be designed in very different ways, such that different spring characteristics can be achieved for different sealing elements.

If a first tab is integrally formed on the first side wall on the end face of the latter which faces away from the bottom part so that it extends in the toward the second side wall, interlocking of two identical sealing elements, for example during transport or during storage in a storage container, can largely be avoided. Moreover, in this regard, there is an advantageous effect when a second tab extending toward the first side wall is integrally formed on the second side wall on the end face of the latter remote from the bottom part, and if the tabs are integrally formed, in particular, in axial end regions of the basic body.

The sealing element is advantageously produced from a spring steel sheet, as a result of which, in particular, high dimensional stability, high wear resistance, high and permanent sealing pressure forces and good frictional properties, in particular with matching components made from aluminum, can be achieved. Furthermore, spring steel sheet is obtainable cost-effectively, and small wall thicknesses and a low weight can advantageously be implemented. In this case, a spring steel sheet with a thickness of between 0.1 mm and 0.5 mm is advantageously used. In this context, basically, the smaller the radii and the more compact the sealing elements are, the smaller is the required thickness of the spring steel sheet. In principle, however, the sealing element may also be produced from other materials such as from a special plastic, etc.

The invention will become more readily apparent form the following description of a particular embodiment thereof shown by way of example only in the accompanying drawings.

DETAILED DESCRIPTION OF A PARTICULAR EMBODIMENT

Figure 1:
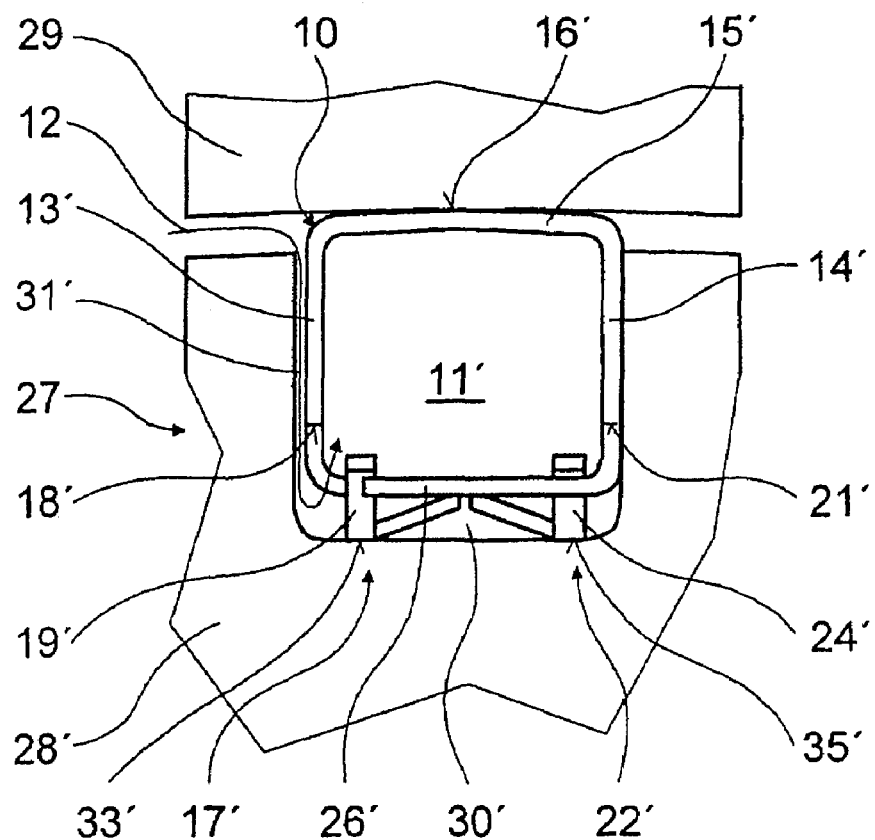
FIG. 1 shows a detail of a pivoting motor for a camshaft timing device with two sealing elements.
Figure 1:
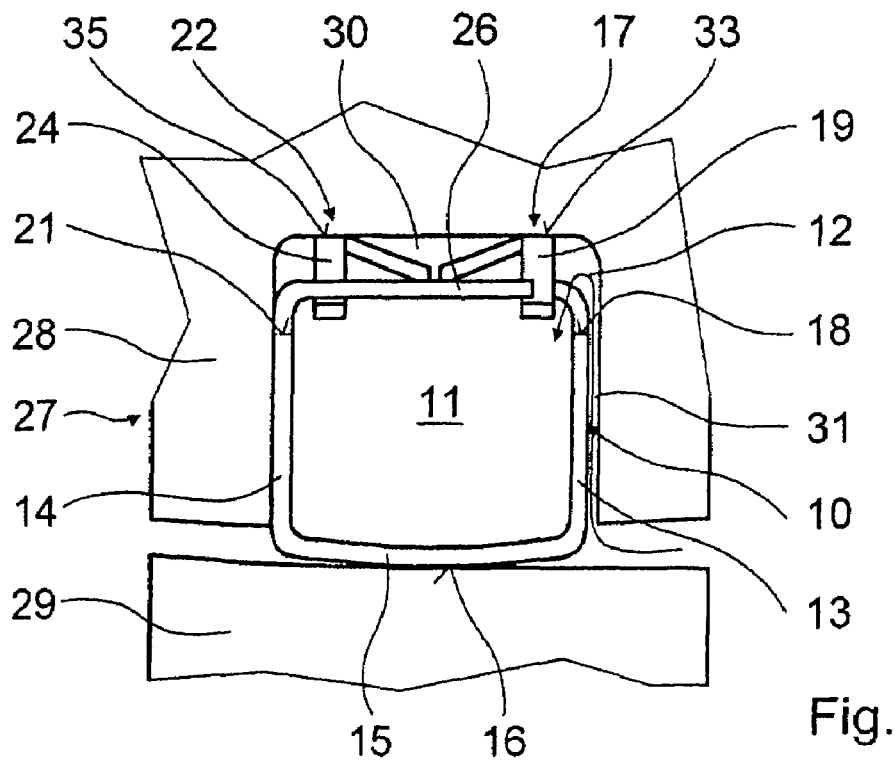
Figure 2:
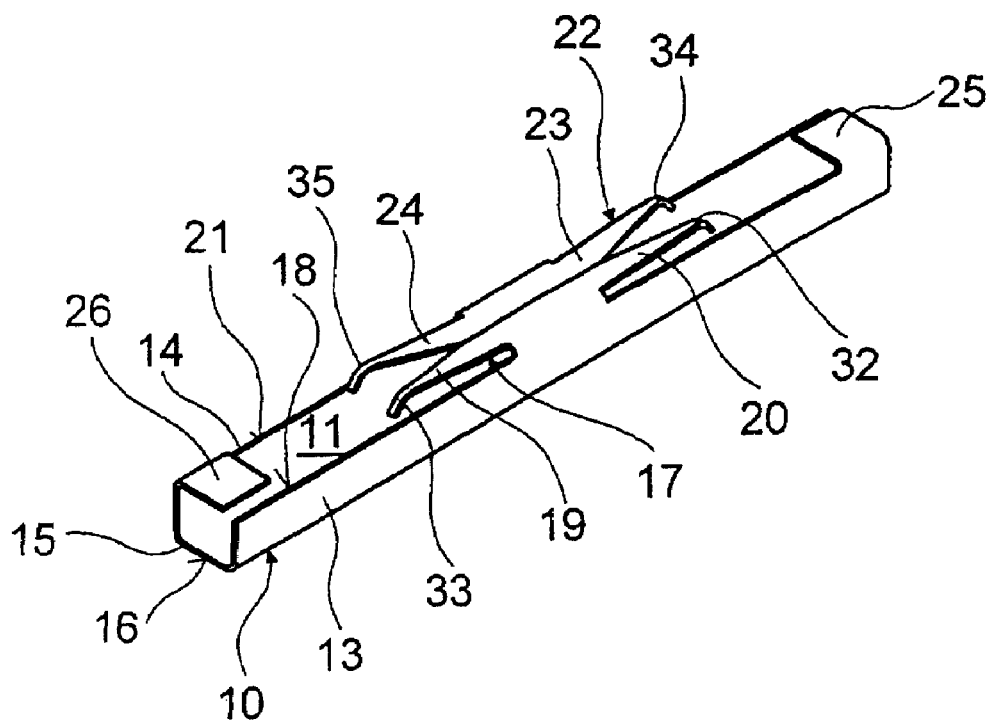
FIG. 2 is a perspective view of a sealing element of the pivoting motor.
Figure 3:
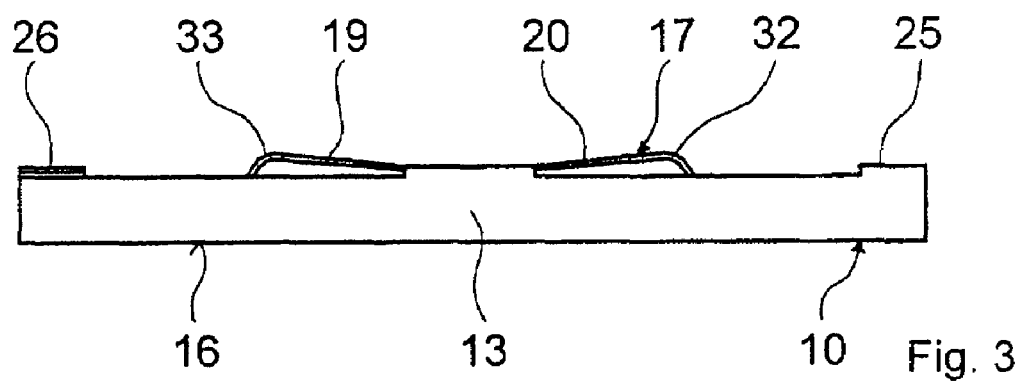
FIG. 3 shows the sealing element of FIG. 2 in a side view.
Figure 4:
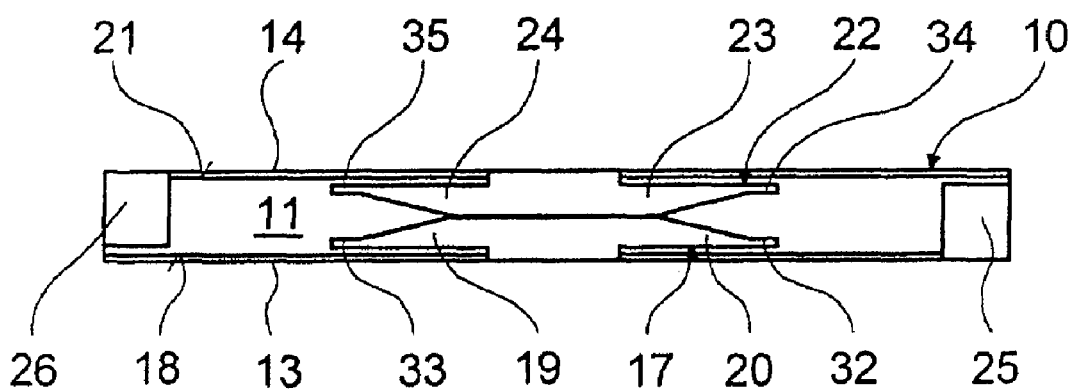
FIG. 4 shows the sealing element of FIG. 2 in a top view.

FIG. 1 shows a detail of a pivoting motor for a camshaft timing device, specifically of a motor vehicle engine. The pivoting motor comprises an impeller 27 (rotary position) with radially outwardly-extending vanes 28, 28', and a housing 29 surrounding the impeller 27 and having radially inwardly-extending segments, not illustrated. The vanes 28, 28' of the impeller 27 are disposed adjacent the circumferentially spaced radial end faces of the segments and extend radially outwardly to a circular wall of the housing 29. From the circular housing wall segments extend radially inwardly to a cylindrical center structure of the impeller 27, which ring carries the vanes 28, 28', so that pressure spaces are formed between the vanes 28, 28' and the segments. Each of the radially outwardly-pointing end faces of the vanes 28, 28' includes a groove 30, 30' which extends in the axial direction of the impeller 27 and in which a sealing element made from a spring steel sheet is disposed.

The vanes 28, 28' and the sealing elements are in each case configured identically, so that the following description can be limited to one of the two vanes and to one of the two sealing elements. As regards the means which are not described more closely below, the details are given the same numerals as with regard to the means described, these numerals being marked merely with an apostrophe to distinguish them.

The sealing element, produced in one stamping/bending operation, has an elongate basic body 10 with a U-profile having a first and a second side wall 13, 14 and with a bottom part 15 (FIG. 1 to 4). The sealing element extends in the axial direction over the entire vane 28 and is arranged, with play transversely to the longitudinal extent of the latter, in the groove 30.

A spring element 17, 22 is integrally formed in each case on end faces 18, 21, facing away from the bottom part 15, of the side walls 13, 14 of the basic body 10, specifically in the middle region of the basic body 10. The spring elements 17, 22 form a top side located opposite the bottom part 15, each comprising two spring arms 19, 20 extending in the axial direction of the basic body 10. The spring arms 19, 20 have, starting from their point of articulation on the side walls 13, 14, a constant width in the axial direction outward in a first region, and narrow down in a second region and have again a constant smaller width in a third region. Furthermore, the spring arms 19, 20 are disposed, starting from their point of articulation on the side walls 13, 14, at an increasing distance from the bottom part 15 and are angled in the direction of the bottom part 15 shortly ahead of their free ends, so that the distance between the contact points 32, 33, 34, 35 of the spring arms 19, 20 is relatively large in the axial direction. In this case, the spring arms 19, 20 are so angled, that the free ends of the spring arms 19, 20 project into an inner space 11 of the basic body 10, whereby the free ends are protected from the surroundings and the surroundings are protected from the free ends.

The basic body 10 of the sealing element is disposed movably in the groove 30 and is supported on the base of the groove 30 of the vane 28 via the contact points 32, 33, 34, 35 of the spring arms 19, 20, 23, 24 (FIG. 1). The spring elements 17, 22 press the basic body 10, with an outer surface 16 of the bottom part 15, remote from the side walls 13, 14, radially outward against an inner circumference of the housing 29 with a first sealing pressure force. The outer surface 16 is convexly curved, so that the latter forms a linear sealing surface disposed axially in the center region of the basic body 10.

Figure 5:
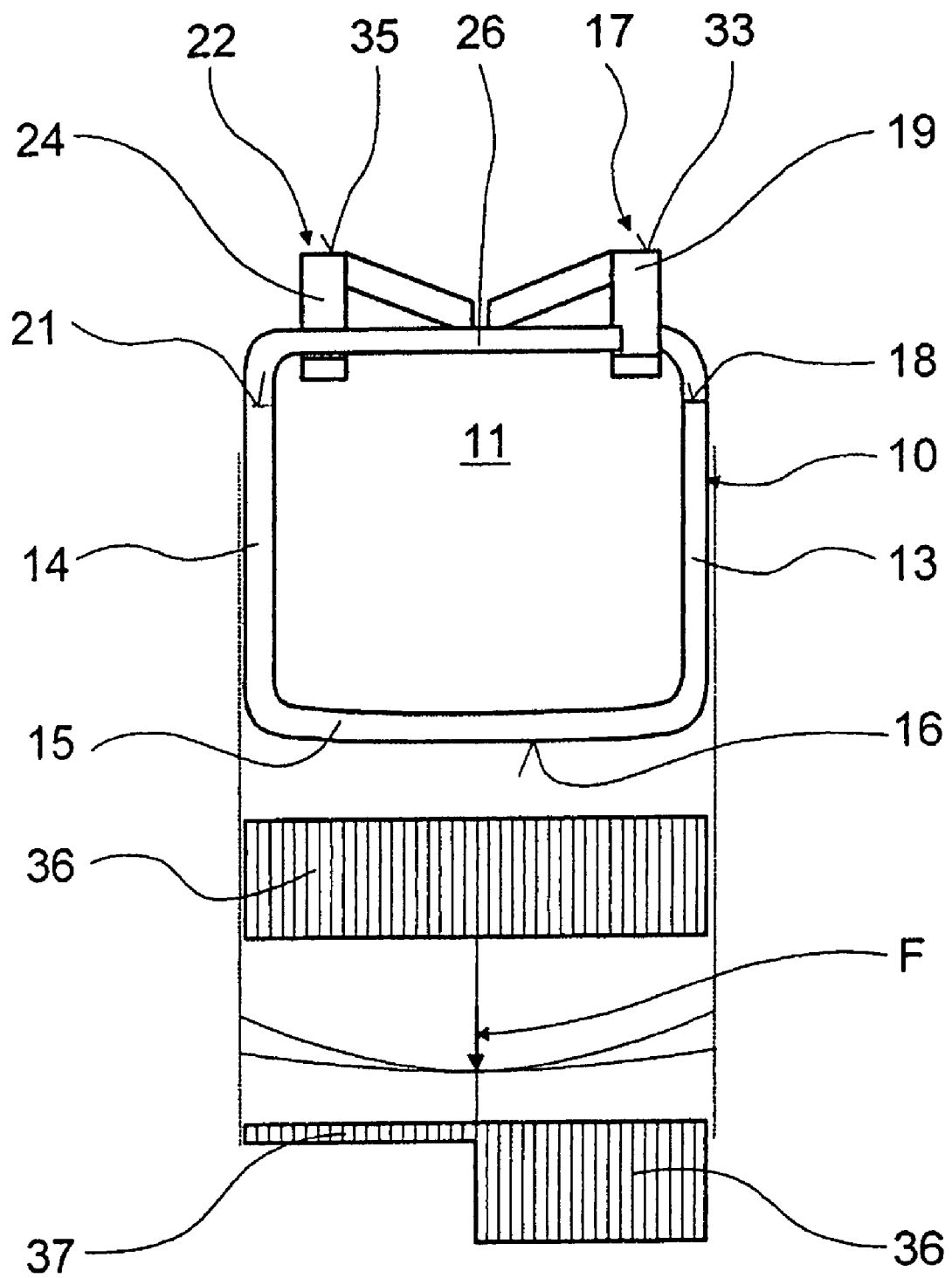
FIG. 5 shows the sealing element of FIG. 2 with a pressure of a pressure medium which acts, during operation, above the sealing element and below the sealing element.

During operation, the inner space 11 of the basic body 10, which inner space is delimited by the side walls 13, 14 and the bottom part 15, is subjected to a pressure medium 12 in order to generate a second sealing pressure force intensifying the first sealing pressure force, the sealing pressure forces being summed up to form a resultant sealing pressure force F (FIG. 5). The inner space 11 is in this case acted upon by the pressure medium 12 via a free space 31 caused by the play, specifically on a high-pressure side in the circumferential direction (FIG. 1). Furthermore, the inner space 11 is acted upon by pressure medium 12 via an axial gap, not illustrated, between the impeller 27 and the component 29.

The basic body 10 is pressed via the pressure medium 12, with the outside of the side wall 14 forming a sealing surface, against a side wall of the groove 30, which side wall extends parallel to the side wall 14. During operation, a high pressure 36 prevailing on the high-pressure side is effective in the radially inner region of the sealing element, while, in the radially outer region under the sealing element, in the circumferential direction starting from the high-pressure side, in the direction of the low-pressure side, the high pressure 36 acts only up to approximately the center area of the sealing element. Beyond the center, a low pressure 37 prevailing on the low-pressure is effective (FIG. 5). When the high-pressure side becomes the low-pressure side and the low-pressure side becomes the high-pressure side, the sealing element is pressed by the pressure medium 12, with an outside area of the side wall 13 forming a sealing surface, against a side wall of the groove 30, which side wall extends parallel to the side wall 13. In the radially outer region under the sealing element, in the circumferential direction, starting from the new high-pressure side in the direction of the new low-pressure side, the high pressure 36 acts up to approximately the center area of the sealing element, and, beyond the center area, the low pressure 37 prevailing on the low-pressure side is effective.

The sealing element seals off a radial gap between the vane 28 of the impeller 27 and the component 29, and it would basically also be conceivable for the sealing element additionally to seal off an axial gap. Furthermore, it is conceivable to use appropriate sealing elements in order to seal off the segments of the housing 29 projecting radially inwardly toward the center of the impeller 27.

In order to avoid several sealing elements being hooked together during transport or storage, a tab 25, 26 is integrally formed, specifically in axial end regions of the basic body 10, on the first side wall 13, at its end face 18 facing away from the bottom part 15, and on the second side wall 14, on the end face 21 facing away from the bottom part, the tab extending to the respective opposite side wall 13, 14.

What is claimed is:

1. A sealing element for forming a seal between an impeller (27) of a pivoting motor and a housing (29) surrounding the impeller (27), said sealing element having a base body (10), a first spring element (17) integrally formed with the base body (10) for generating a first sealing pressure force, the base body (10) having an inner space (11) for receiving a pressure medium (12) in order to generate a second sealing pressure force intensifying the first sealing pressure force.

2. The sealing element as claimed in claim 1, wherein the base body (10) has a profile closed on three sides and open on one side, with a first and a second side wall (13, 14) and with a bottom part (15).

3. The sealing element as claimed in claim 2, wherein an outer surface area (16) of the bottom part (15) facing away from the side wall (13, 14), forms at least a first sealing surface area.

4. The sealing element as claimed in claim 3, wherein the outer surface area (16) has a convex configuration.

5. The sealing element as claimed in claim 2, wherein the first spring element (17) is integrally formed on an end face (18) of the first side wall (13), said end face facing away from the bottom part (15).

6. The sealing element as claimed in claim 5, wherein the first spring element (17) has two spring arms (19, 20) extending in the axial direction of the basic body (10).

7. The sealing element as claimed in claim 5, wherein a second spring element (22) is integrally formed on the second side wall (14) on that end face (22) of the latter which faces away from the bottom part (15).

8. The sealing element as claimed in claim 2, wherein a tab (25) extending in the direction of the second side wall (14) is integrally formed on the first side wall (13) on that end face (18) of the latter which faces away from the bottom part (15).

9. The sealing element as claimed in claim 8, wherein a tab (26) extending in the direction of the first side wall (13) is integrally formed on the second side wall (14) at the end face (21) thereof which faces away from the bottom part (15).

10. The sealing element as claimed in claim 9, wherein the tabs (25, 26) are integrally formed in axial end regions of the basic body (10).

11. The sealing element as claimed in claim 1, wherein the spring element is formed from a spring steel sheet.

12. A pivoting motor for a camshaft timing device, with an impeller (27) disposed in a housing (29) surrounding the impeller (27) and a sealing element disposed between an impeller (27) of a pivoting motor and a housing (29) surrounding the impeller (27), said sealing element having a base body (10), a first spring element (17) integrally formed with the base body (10) for generating a first sealing pressure force, the base body (10) having an inner space (11) for receiving a pressure medium (12) in order to generate a second sealing pressure force intensifying the first sealing pressure force.

13. The pivoting motor as claimed in claim 12, wherein the sealing element (17) is arranged, with play, transversely to its longitudinal extent, in a groove (30), and the inner space (11) can be acted upon by the pressure medium (12) via a free space (31) provided by the play.

* * * * *